US006271982B1

(12) United States Patent
Helmick

(10) Patent No.: US 6,271,982 B1
(45) Date of Patent: Aug. 7, 2001

(54) AUTOMATED PRECISION CASSETTE HANDLING SYSTEM

(75) Inventor: Mark H. Helmick, Ventura, CA (US)

(73) Assignee: Qualstar Corporation, Canoga Park, CA (US)

( * ) Notice: Subject to any disclaimer, the term of this patent is extended or adjusted under 35 U.S.C. 154(b) by 0 days.

(21) Appl. No.: 08/427,884

(22) Filed: Apr. 26, 1995

(51) Int. Cl.$^7$ .................................................. G11B 15/68
(52) U.S. Cl. ............................................ 360/92; 360/96.5
(58) Field of Search ................ 360/92, 96.5; 390/98.04; 369/178, 36, 191, 192, 34, 247, 263

(56) References Cited

U.S. PATENT DOCUMENTS

| | | | |
|---|---|---|---|
| 4,685,095 | * 8/1987 | Rudy et al. | 369/36 |
| 4,922,478 | * 5/1990 | Verhagen | 369/247 |
| 4,972,277 | 11/1990 | Sills et al. | 360/92 |
| 4,984,106 | 1/1991 | Herger et al. | 360/92 |
| 5,036,503 | * 7/1991 | Tomita | 360/92 |
| 5,059,772 | 10/1991 | Younglove | 360/92 |
| 5,103,986 | 4/1992 | Marlowe | 211/41 |
| 5,146,375 | * 9/1992 | Satoh et al. | 360/92 |
| 5,347,507 | * 9/1994 | Kühn | 369/263 |
| 5,353,179 | * 10/1994 | Elliot et al. | 369/34 |
| 5,402,283 | * 3/1995 | Yamakawa et al. | 360/92 |

FOREIGN PATENT DOCUMENTS 5-314613A * 11/1993 (JP) .

* cited by examiner

Primary Examiner—Sara Crane
(74) Attorney, Agent, or Firm—Oppenheimer Wolff & Donnelly LLP

(57) ABSTRACT

A cassette handling system has a plurality of storage units each storing a plurality of cassettes and at least one tape drive unit. A carrier assembly transports a cassette from one unit to another by extracting the cassette from one of the units and inserting the cassette into another unit. An engaging assembly with a pair of couplers is mounted on a carrier of the carrier assembly. The couplers engage the cassette and hold the cassette above a reference platen on the top of the carrier. The reference platen defines a position from which the cassette is insertable into the units without obstruction. The engaging assembly disengages the cassette onto the reference platen and immediately re-engages the cassette in an accurately determined vertical position. The cassette is then inserted into the desired unit. The carrier assembly also has a threaded shaft which is tensioned for avoiding or damping vibration due to the movement of various components thereof.

14 Claims, 4 Drawing Sheets

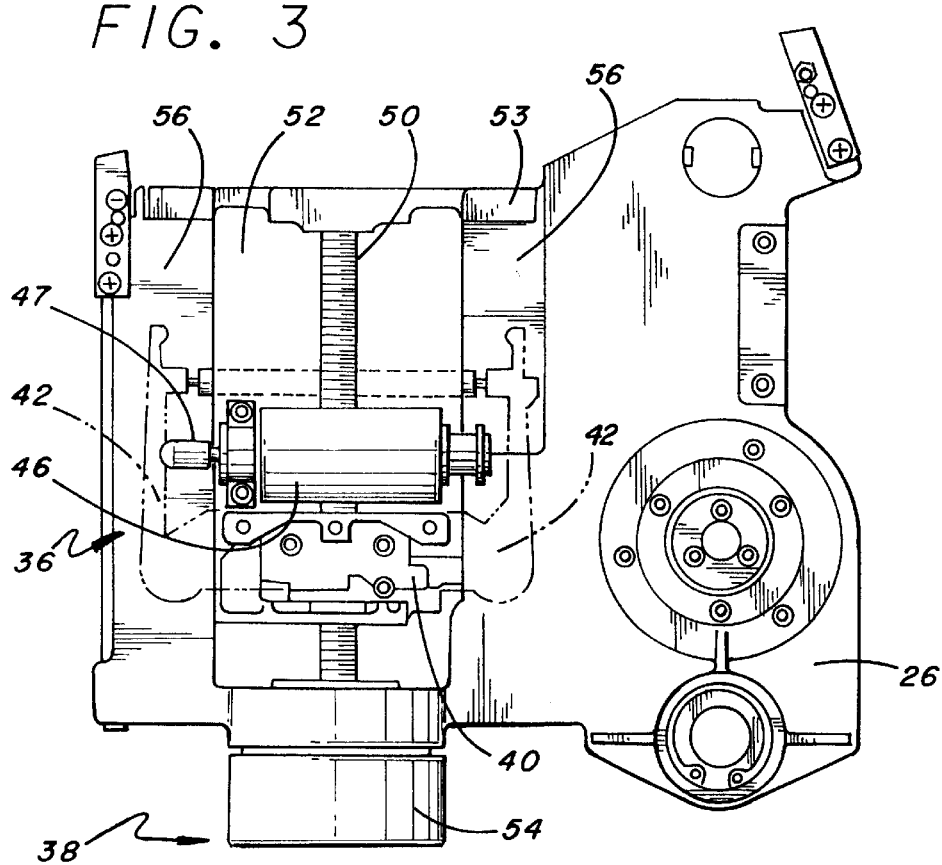
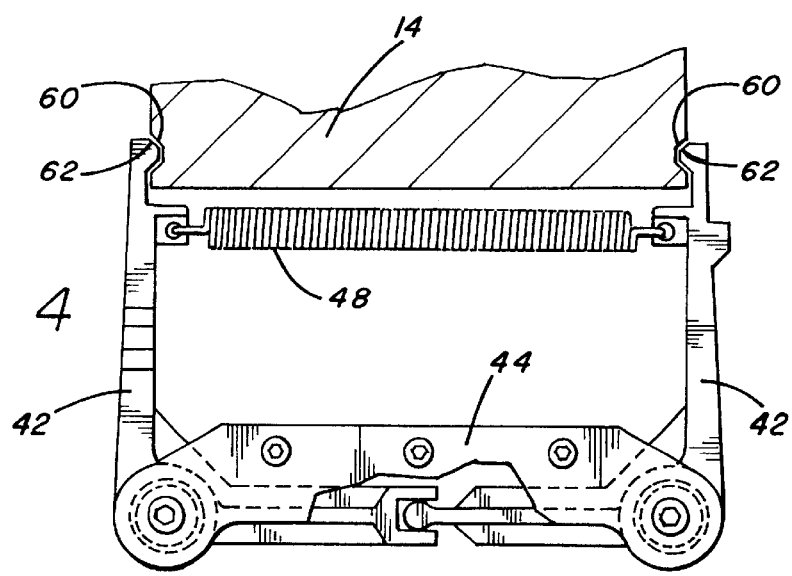

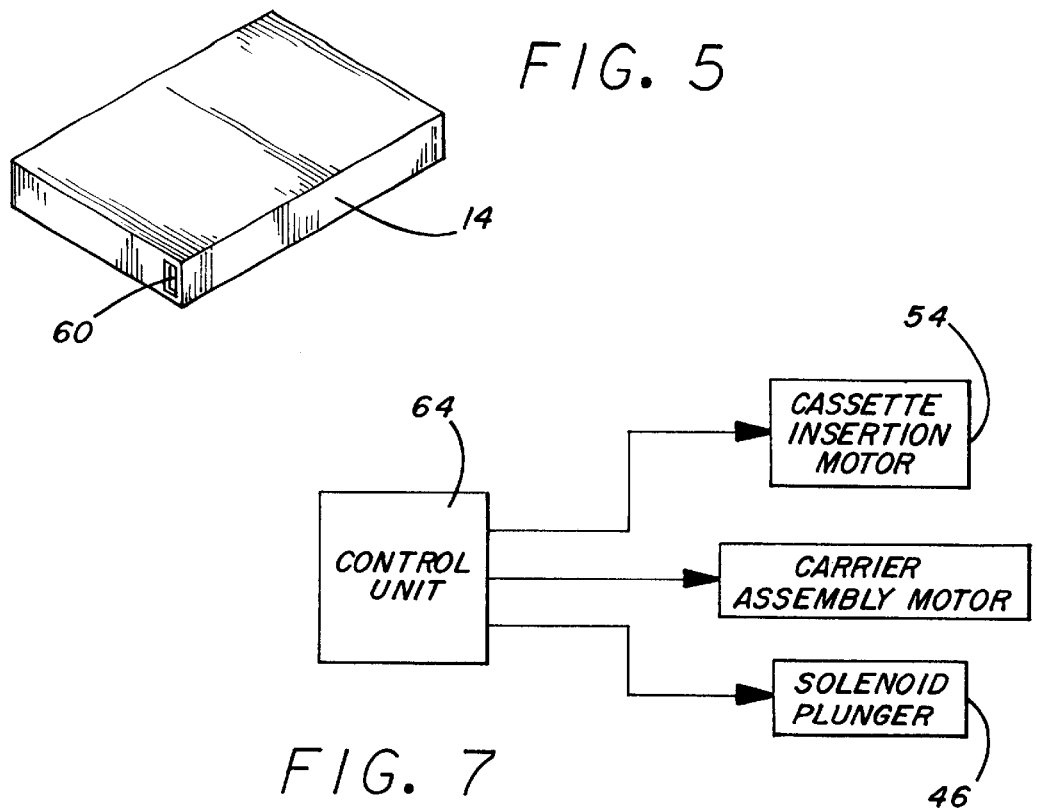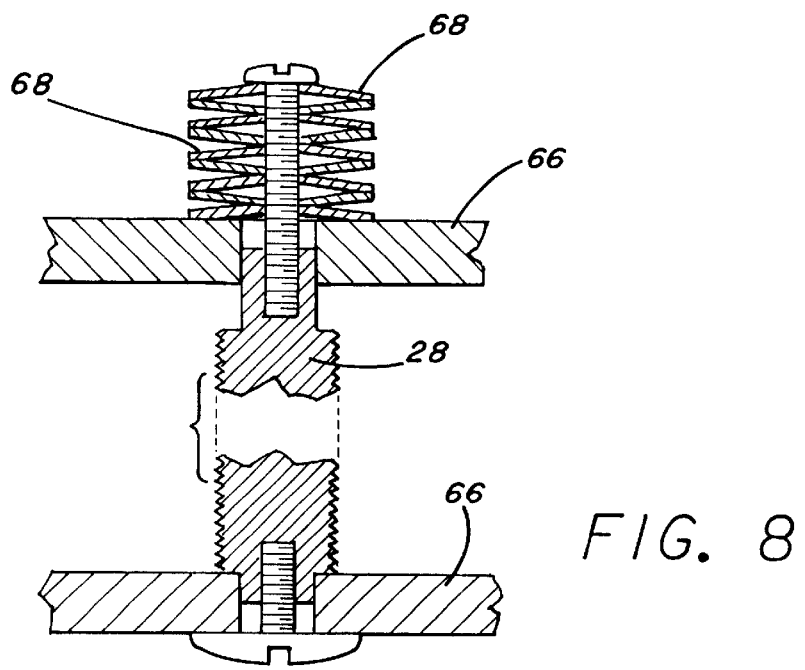

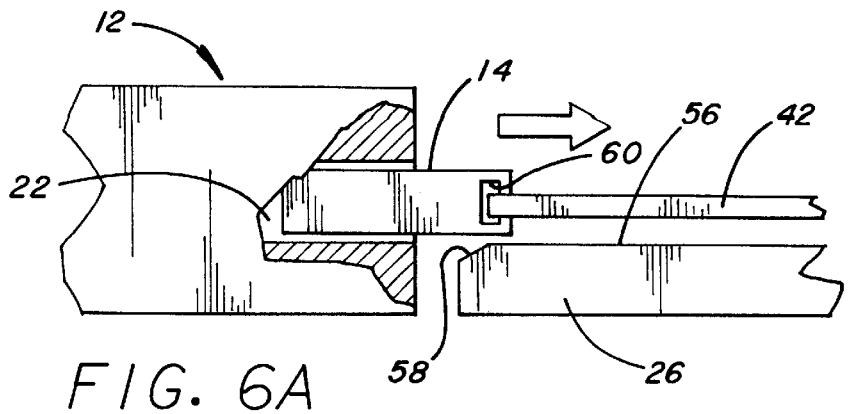
FIG. 6A
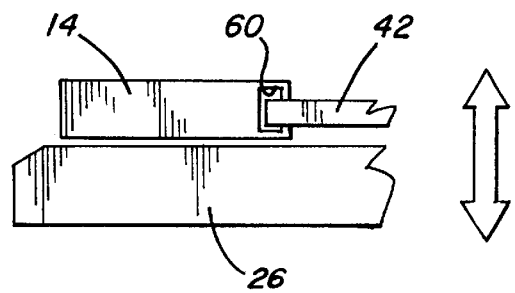
FIG. 6B
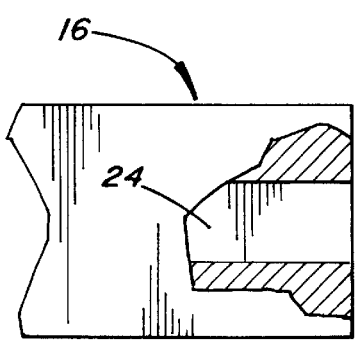
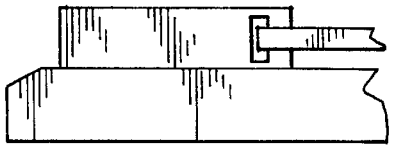
FIG. 6C
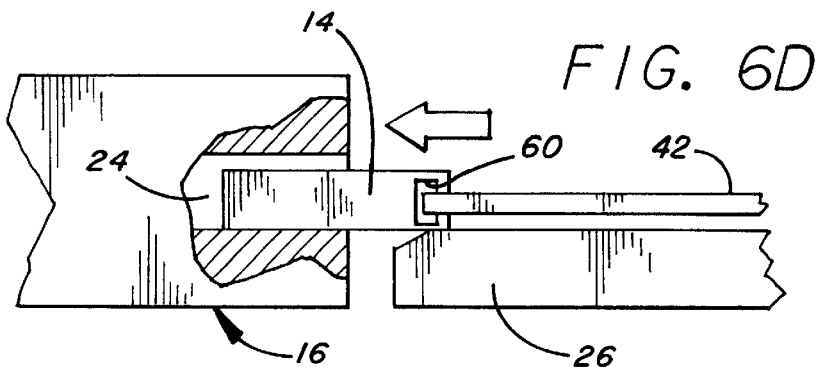
FIG. 6D

US 6,271,982 B1

AUTOMATED PRECISION CASSETTE HANDLING SYSTEM

BACKGROUND OF THE INVENTION

1. Field of the Invention

The present invention relates to cassette handling systems and, more particularly, to automated cassette handling systems for magnetic-medium cassettes or the like with high reliability.

2. Description of Related Art

Tape library systems are used to store large amounts of data on tape. They may be employed in a hierarchial storage management system, such as a concurrent backup system for data stored on hard disk drives in a computer system or as a data library for access by a computer system. While many personal computers today store up to 500 megabytes or more on hard disk, tape library systems are able to store 50 to 500 times as much data, with some systems yielding capacities over one terabyte (one million megabytes).

A primary concern to a user of tape library systems is reliability. As many customers such as banks, airlines, government agencies, and so on rely on tape library systems for storing and accessing data, it is critical that the library system does not malfunction, preventing a user from accessing information stored in the system. Furthermore, speed is also essential in the desirability of a system.

A typical tape library system for storing a number of tapes or cartridges on which data are stored magnetically has a storage unit for storing the tapes and a number of tape drives for reading or writing data. One known cassette or cartridge rack for magnetic tapes is disclosed in U.S. Pat. No. 5,103,986, granted to C. P. Marlowe on Apr. 14, 1992. A control system, which has an interface with a computer, transports the tapes from the storage unit to one of the tape drives and vice versa, which is called an exchange. The control system includes electromechanical apparatus which moves within the library system. As is true with any electromechanical process or movement, the accuracy and reliability of the process relies upon the precision of the movement and the associated tolerances. Therefore, in order to maximize the number of exchanges which are accomplished without any malfunction of the system, the precision of the process should be maximized, while of course taking into consideration cost-effectiveness and other related factors. Collateral factors which deserve consideration include speed of operation and compactness of the system.

Accordingly, principal objects of the present invention are to increase the precision of cassette handling systems, to increase reliability and/or compactness of such systems, and to operate the systems at high speed compatible with electromechanical reliability.

SUMMARY OF THE INVENTION

A cassette handling system according to an exemplary embodiment of the present invention stores a plurality of cassettes in storage units and transports one of the cassettes from one of the storage units on a carrier assembly to a tape drive unit, or vice versa. Prior to inserting the cassette into one of the units, the position of the cassette is accurately positioned with respect to the unit into which it is being inserted by repositioning the cassette on a reference platen. The reference platen defines a position from which the cassettes are insertable into the units without obstruction. Accordingly, the cassette handling system has a high reliability in that the number of transportation sequences or exchanges without malfunction is increased. Furthermore, the cassette handling system may store cassettes with increased density as the cassettes are precisely transported throughout the system, requiring less space between individually stored cassettes.

More specifically, the cassette handling system generally includes the carrier assembly with the reference platen positioned thereon and an engaging assembly with a pair of couplers for engaging a cassette. A control unit actuates various motors to displace the carrier assembly between the storage and tape drive units, to extract and insert the cassette respectively from and into the units, and to reposition the cassette being transported accurately.

In operation, the carrier assembly is displaced to a unit in which a desired cassette is received. The cassette is engaged by the couplers and extracted from the unit. The cassette is engaged by the engaging assembly above the reference platen. The carrier assembly is then displaced to a vacant unit. Before the cassette is inserted into the unit, the couplers disengage the cassette onto the reference platen and re-engage the cassette while it is positioned on the reference platen. The cassette is then inserted into the desired unit.

By repositioning the cassette, any uncertainty in the movement of the carrier assembly to one of the units from which a cassette is to be extracted is substantially eliminated, such that the cassette is insertable into another one of the units without failure due to this uncertainty. Considering this procedure from another aspect, when the mechanical couplers engage the cassette to extract it from a first unit, there is a first tolerance or possibility for slight displacement between the carrier assembly and the first unit, so that the cassette may be gripped and held in a location slightly displaced from the optimum position relative to the carrier. Similarly, there is a second tolerance or possibility that the receiving slot may not be aligned with the optimum carrier alignment position. By the use of the reference platen, any uncertainty due to these tolerances is essentially eliminated, as the insertion is always accomplished from the same position relative to the carrier. Also, by accurately positioning the cartridge immediately before inserting it into a unit, any possible undesired shifting of the cartridge in the couplers as a result of external vibration or the like, in the course of carrier movement, is eliminated.

In order to additionally improve the reliability of the cassette handling system according to the present invention, vibration within the carrier assembly is substantially reduced or eliminated. The carrier assembly is shifted or displaced between the units by means of a drive collar received on a threaded shaft. A carrier motor rotates the drive collar about the shaft, thereby displacing the carrier assembly. The shaft might potentially vibrate as a result of various forces caused by the rotation of the drive collar thereabout, or by environmental vibration. Therefore, a plurality of compression springs are disposed at one of the ends of the threaded shaft to increase the axial tension on the shaft to raise the resonant frequency and to preclude or damp the potential vibration thereof so that the carrier assembly moves between the units smoothly and precisely.

Additional aspects and advantages of the present invention will become apparent to one skilled in the art from the following detailed description and illustrative accompanying drawings. As will be realized, the invention is capable of other embodiments and of modifications in various respects without departing from the scope of the invention.

BRIEF DESCRIPTION OF THE DRAWINGS

FIG. 3 is a top view of a carrier of the carrier assembly;

FIG. 4 is a top view of a pair of couplers of the engaging assembly showing the couplers engaged with a cassette (shown in cross section);

FIG. 5 is a perspective view of a cassette particularly showing a notch formed therein;

FIGS. 6A to 6D are side views of a portion of the carrier assembly with a cassette, respectively illustrating an extracting step, a transporting step, a repositioning step, and an inserting step in accordance with the present invention;

FIG. 7 is a block diagram of control circuitry illustrating the principles of the invention; and FIG. 8 is a cross-sectional view of a threaded shaft with springs at one end thereof.

DETAILED DESCRIPTION OF THE PREFERRED EMBODIMENTS

Figure 1:
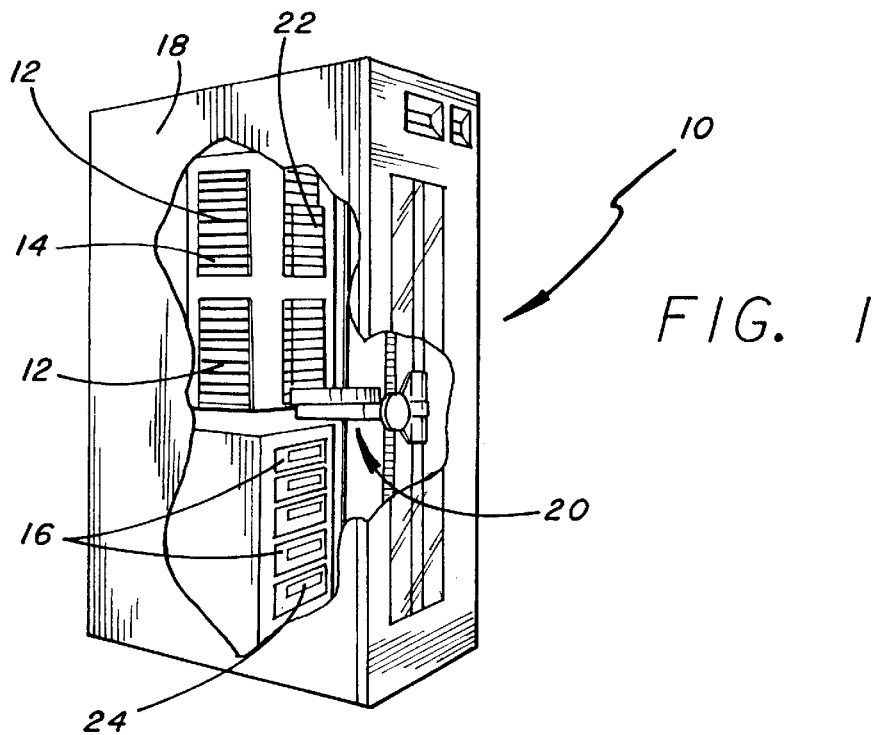
FIG. 1 is a perspective view of an automated cassette handling system with a portion of the housing thereof cut away, illustrating the principles of the present invention.

Referring to the drawings, particularly to FIG. 1, an automated precision cassette handling system 10 according to an exemplary embodiment of the present invention is shown and generally includes at least one but preferably a plurality of storage units 12 for storing a plurality of cassettes 14, at least one but preferably a plurality of tape drive units 16 for reading data from or writing data to the cassettes 14, a cabinet 18 with a door, and a carrier assembly 20 for transporting one of the cassettes 14 from one of the storage units 12 or the tape drives 16 to one of the tape drives 16 or the storage units 12. The cassette handling system 10 is preferably used in the handling of magnetic media cassettes or cartridges, for example, eight-millimeter tape cartridges, employed by companies for storing large amounts of data, for example, from 25 gigabytes to over 1.6 terabytes.

More specifically, the storage units 12 are preferably of the type which has a plurality of vertically disposed ports or slots 22 in which the cassettes 14 are stored. Further, a number of the storage units 12 may be mounted on a carousel which rotates within the cabinet 18 for greater storage density. In general, the storage units 12 may collectively store anywhere up to 120 or more of the cassettes 14. Concerning the tape drives 16, there may be up to six or more of the tape drives 16 provided to receive the cassettes 14. The tape drives 16 are preferably vertically disposed so that ports 24 in which the cassettes 14 are received are substantially vertically aligned.

Figure 2:
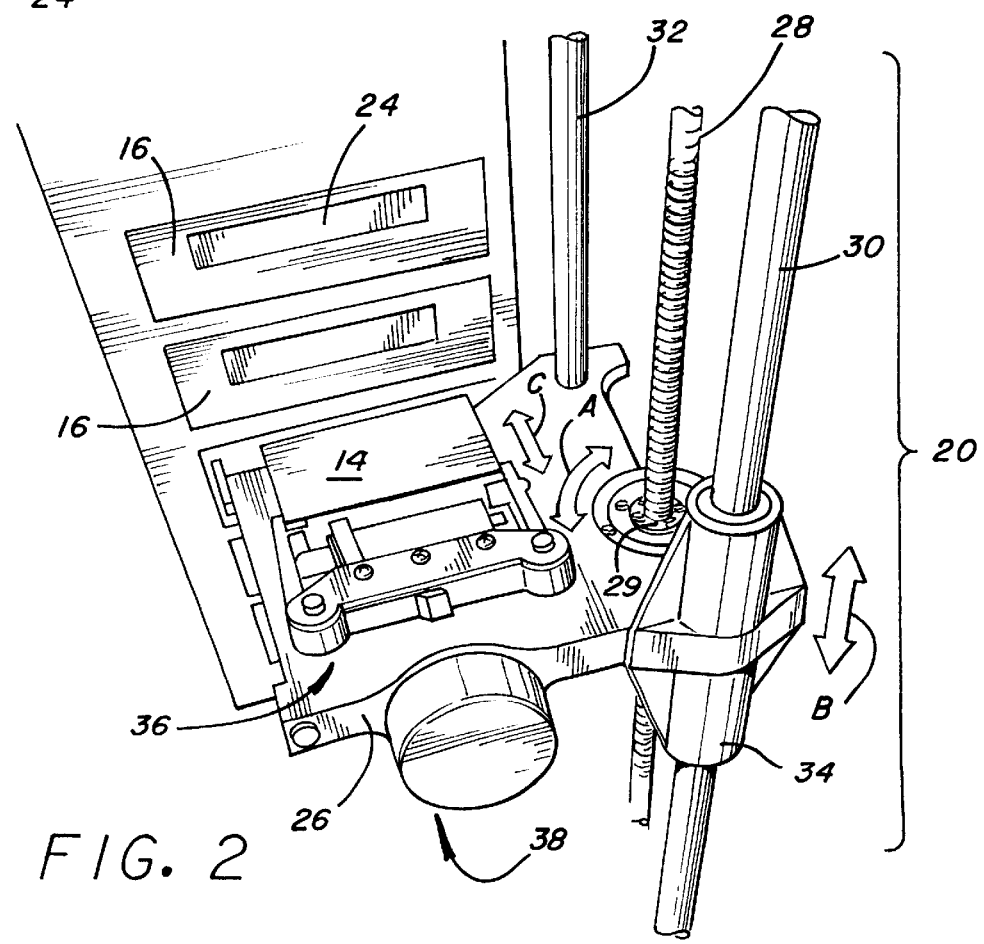
FIG. 2 is a perspective view of a carrier assembly of the invention, particularly showing a cassette engaged by an engaging assembly thereof.

With additional reference to FIG. 2, the carrier assembly 20 generally includes a carrier 26 threadedly mounted on a threaded shaft 28 by means of a drive collar 29 and slidably mounted on a primary support column 30. The carrier 26 may be further slidably mounted on a secondary support column 32 which is in a spaced relationship with the primary support column 30. The shaft 28 and the support columns 30 and 32 are disposed substantially vertically in the cabinet 18, so that the carrier 26 is substantially horizontal with respect thereto and to the storage units 12 and the tape drives 16. The drive collar 29 is coupled to a carrier motor (not shown) mounted to the bottom side of the carrier 26 and rotates upon actuation thereby, as shown by arrow A, so that the carrier 26 is displaced vertically, as shown by arrow B.

The carrier 26 is preferably provided with a vertically disposed linear-bearing housing 34 through which the primary support column 30 is slidably received. As the drive collar 29 rotates to drive the carrier 26 for vertical displacement, the carrier 26 is subject to frictional and torsional forces which influence the carrier 26 to rotate within or through the horizontal plane. Furthermore, the moment caused by motor torque influences the carrier 26 to rotate across the horizontal plane. Therefore, the secondary support column 32 and the linear-bearing housing 34 are provided to counteract these forces coplanar with and normal to the horizontal plane. Accordingly, the carrier 26 is substantially free of play both in the horizontal plane and in angular rotation across the horizontal plane; that is, the carrier assembly 20 precisely transports one of the cassettes 14 in the vertical direction.

With continued reference to FIG. 2, the carrier assembly 20 further includes an engaging assembly 36 for engaging with and adjusting the position of one of the cassettes 14, and a driving assembly 38 for translating the cassette engaging assembly 36 horizontally. The engaging assembly 36 is preferably disposed on the top side the carrier 26, and the driving assembly 38 is attached to the carrier 26 and is coupled to the engaging assembly 36.

In the general operation of the carrier assembly 20, the carrier 26 is positioned in front of one of the cassettes 14 received in one of the slots 22 or the ports 24. The driving assembly 38 translates the engaging assembly 36 toward the cassette 14, as shown by arrow C, and the engaging assembly 36 engages the cassette 14. The cassette 14 is extracted from the slot 22 or the port 24 by the driving assembly 38 translating the engaging assembly 36 away therefrom. The drive collar 29 then rotates about the shaft 28 to drive the carrier 26 to another location in front of a vacant slot 22 or port 24, and the engaging assembly 36 accurately positions the vertical position of the cassette 14 by substantially eliminating any uncertainty in the position of the cassette 14 with respect to the vacant slot 22 or port 24 due to the movement of the carrier 26 prior to the extraction of the cassette 14. The cassette 14 is then inserted into the vacant slot 22 or port 24 by translating the engaging assembly 36 with the driving assembly 38 and disengaging the cassette 14 with the engaging assembly 36. This entire operation involving shifting the position of a cassette or cartridge is called an "exchange."

In order for the cassette handling system 10 to have a high reliability, i.e., to have a relatively high number of exchanges without malfunction, the movement of the various components must be precise so that the cassette 14 is in the proper position for extracting one of the cassettes 14 from a slot 22 or port 24 and for inserting the cassette 14 into one of the slots 22 or the ports 24. As described above, horizontal and angular movement or play of the carrier 26 is substantially eliminated by the provision of the linear-bearing housing 34 and the support columns 30 and 32. Furthermore, by the cartridge or cassette engaging assembly 36 repositioning the vertical position of the cassette 14 prior to the inserting step described above substantially improves the reliability of the cassette handling system 10.

With additional reference to FIGS. 3 and 4, exemplary embodiments of the engaging assembly 36 and the driving assembly 38 are shown in detail. The engaging assembly 36 generally includes a base structure 40, a pair of oppositely disposed couplers 42 (shown in phantom line in FIG. 3) with a brace 44 disposed therebetween and mounted to the base structure 40, a solenoid 46 having an inner plunger 47 and mounted to the base structure 40 for urging the couplers 42 apart, and a spring 48 attached to the couplers 42 for urging the couplers 42 together. The driving assembly 38 generally includes a threaded shaft 50 spanning an opening 52 in the carrier 26 and a cassette insertion motor 54 for driving the shaft 50. The base structure 40 of the engaging assembly 36 is threadedly mounted on the shaft 50 of the driving assembly 38 and is received within the opening 52, so that the couplers 42 are above the top sure of the carrier 26. The couplers 42 are in cooperation such that as the plunger 47 engages and urges outwardly one of the couplers 42, the other coupler 42 moves accordingly.

Particularly referencing FIG. 3, in addition to the opening 52 formed in the carrier 26, there is a reference platen 56 formed by two spaced surfaces on the top surface of the carrier 26, and a beveled edge 58 formed at the edge of the carrier 26 nearest the storage units 12 or the tape drive units 16. The reference platen 56 forms a substantially level surface on which the cassettes 14 are slidable and defines an accurate vertical position in the horizontal plane with respect to the slots 22 and ports 24. From this accurate position, the cassettes 14 are insertable into the slots 22 and the ports 24 without obstruction. Further, the cassettes 14 may be slidable on the beveled edge 58, which terminates at the reference platen 56.

With further reference to FIG. 4 and with additional reference to FIG. 5, each cassette 14 has a pair of notches 60 formed in opposite sides thereof, and each of the couplers 42 has an inwardly protruding projection 62 formed on the end thereof. As can be seen in FIG. 5, the notches 60 have a vertical dimension which is greater than the vertical dimension of the projections 62; therefore, the projections 62 are respectively receivable within the notches 60 so that the couplers 42 engage with the cassette 14. Further, the spring 48 draws the couplers 42 together with sufficient force so that the cassette 14 is securely held by the couplers 42, even in the event of an electrical power failure.

With additional reference to FIGS. 6A to 6D and with reference to FIG. 7, an exemplary exchange and repositioning sequence for one of the cassettes 14 will now be discussed. As shown in FIG. 7, the relationship between a control unit 64 and the electromechanical devices which actuate the various assemblies of the invention is shown. The control unit 64 may be coupled to, for example, a computer system operated by a user. When the user needs to access data stored on the cassettes 14, the computer system actuates the control unit 64. The control unit 64 determines which one of the storage units 12 (cf. FIG. 1) is storing the desired cassette 14 and which one of the slots 22 is holding the desired cassette 14 by means of "address" information stored within the system. The control unit 64 actuates the carrrier motor to rotate the drive collar 29 about the shaft 28 to displace the carrier 26 vertically to the slot 22 storing the desired cassette 14. When the carrier 26 has arrived at the occupied slot 22 and the couplers 42 are substantially aligned with the cassette 14, the control unit 64 actuates the insertion motor 54 to drive the couplers 42 forward (with the plunger of the solenoid 46 extended). When the couplers 42 have been translated a predetermined distance which substantially aligns the projections 62 with the notches 60, the control unit 64 actuates the solenoid 46 to retract the plunger, thereby closing the couplers 42 under the influence of the spring 48 and placing the projections 62 in the notches 60 at an inaccurate position. The control unit 64 then actuates the insertion motor 54 to extract the cassette 14 from the slot 22, as shown by FIG. 6A.

The exchange sequence hereto described may be defined as an "extraction sequence" as this is the sequence of steps required to extract the cassette 14 from one of the occupied slots 22 or ports 24. The carrier 26 is displaced to the occupied slot 22 with a precision sufficiently precise to allow the projections 62 to be receivable in the notches 60 of the cassette 14 (i.e., the vertical midpoint of the projections 62 are substantially aligned with the vertical midpoint of the notches 60). However, there is a certain tolerance accompanying this particular precision, in that there will be a small uncertainty within the tolerance in the overall positioning of the carrier 26 with respect to the slot 22. This uncertainty of the extraction sequence will be discussed in relation to the repositioning procedure below.

Upon completion of the extraction sequence, an insertion sequence is commenced. After the cassette 14 is fully extracted from the port 22 and is positioned above the reference platen 56 on top of the carrier 26, the control unit 64 actuates the carrier motor to rotate the drive collar 29 about the shaft 28 to displace the carrier 26 vertically to the vacant port 24 of one of the tape drives 16, as shown in FIG. 6B. The carrier 26 is displaced to a position which substantially aligns the couplers 42 with the vacant port 24. As with the extraction sequence, there may be a small uncertainty within the tolerance of the carrier assembly 20 as the carrier 26 is displaced to the vacant port 24.

Regarding the repositioning or accurate positioning vertically of the cassette 14, after the cassette 14 has been extracted from the slot 22 and is positioned above the reference platen 56 and before the cassette 14 is inserted into the vacant port 24, the vertical position of the cassette 14 is accurately positioned by a repositioning sequence: the control unit 64 actuates the solenoid 46 to extend the plunger 47 to engage one of the couplers 42, thereby urging the couplers 42 outwardly and disengaging the cassette 14; the cassette 14 is positioned or "falls" onto the reference platen 56; and the control unit 64 then actuates the solenoid 46 to retract the plunger, thereby drawing the couplers 42 together under the influence of the spring 48 and re-engaging the cassette 14 by placing the projections 62 in the notches 60 at an accurate position. The position of the cassette 14 is now accurately positioned vertically, as shown in FIG. 6C, and is exclusive of the uncertainty due to the extraction sequence. As speed is desirable, the repositioning sequence is preferably performed quickly, in that the couplers 42 essentially re-engage the cassette 14 immediately after disengagement and placement of the cassette 14 on the reference platen 56. The repositioning sequence may be thought of as a calibration sequence, in that the position of the cassette 14 is calibrated, and any error present in a process is eliminated so that the process proceeds accurately and precisely.

The control unit 64 then actuates the insertion motor 54 to drive the engaging assembly 36 forward, as shown by FIG. 6D. The cassette 14 is inserted into the vacant port 24 a predetermined distance. The control unit 64 then actuates the solenoid 46 to extend the plunger 47, thereby urging the couplers 42 outwardly so that the projections 62 are out of the notches 60. The control unit 64 subsequently actuates the insertion motor 54 to draw the engaging assembly 36 away from the now-occupied port 24, thus completing the insertion sequence. The control unit 64 may now begin another extraction sequence.

Discussing further the above-described repositioning sequence in relation to the other components of the cassette handling system 10, in order to increase the reliability of the cassette handling system 10 by increasing the number of exchanges between failure, any uncertainty which is able to be minimized or eliminated should be, within of course reasonable cost-effectiveness and diminishing returns. As discussed above, the provision of the support columns 30 and 32 and the linear-bearing housing 34 is one design consideration which reduces uncertainty in the movement of the carrier 26 during the exchange. Furthermore, the provision of the beveled edge 58 also reduces the probability of failure: as it is conceivable that the tolerance in the movement of the carrier 26 to the occupied slot 22, i.e., the extraction sequence, may be larger than the that of the insertion sequence as the uncertainty of the extraction sequence is essentially eliminated, if the carrier 26 were to be moved to a position at which the projections 62 were still receivable in the notches 60 yet the bottom of the cassette 14 were below the plane of the reference platen 56, the cassette 14 would still be extractable in that as the shaft 50 rotates and extracts the cassette 14, the front bottom edge of the cassette 14 would come in contact with the beveled edge 58 and slide upwardly and onto the reference platen 14; accordingly, when the couplers 42 disengage the cassette 14 for repositioning, the cassette 14 would not fall onto the reference platen 56 but would merely remain in place, and any forces acting on the couplers 42 as a result of the cassette 14 being urge upwardly while engaged thereby would be eliminated.

Accordingly, these design considerations coupled with the repositioning sequence yield a total uncertainty as a function of the sum of at least the extract uncertainty and the insert uncertainty. Therefore, by instituting the repositioning sequence, the extract uncertainty is substantially eliminated from the equation. Accordingly, any uncertainty in the alignment of the cassette 14 in front of the vacant port 24 is due substantially to the insertion sequence; that is, the total uncertainty is exclusive of the extract uncertainty. Not only does this increase the reliability of the cassette handling system 10, but it also makes it possible to increase the density of the stacking or storage of the cassettes 14: as the cassettes 14 are more reliably inserted into the slots 22 of the storage units 12, the storage units 12 may be efficiently designed to eliminate space once allocated to accommodate the larger uncertainty in the position of the cassette 14 and tolerance in the movement of the carrier 26, thereby storing more cassettes 14 per unit volume. Taking all of the design considerations discussed above into consideration, the cassette handling system 10 may have an estimated reliability on the order of 500,000 or more exchanges between failures.

In order to illustrate in a specific example of how the repositioning sequence increases the reliability of the cassette handling system 10, an exemplary exchange will now be discussed: the transportation of a cassette 14 from a storage unit 12 located above a tape drive 16. Assume that the tolerance in moving the carrier 26 to an occupied slot 22 to assure that the projections 62 of the couplers 42 are receivable in the notches 60 of the cassette 14 to be transported is plus or minus 0.10 inch from the most desirable position, that is, the position at which the vertical midpoint of the projections 62 is aligned with the vertical midpoint of the notches 60, and assume that the tolerance in moving the carrier 26 to a vacant port 24 to assure that the cassette 14 is insertable thereinto is also plus or minus 0.10 from the most desirable position, that is, the position at which the vertical midpoint of the couplers 42 is aligned with the vertical midpoint of the port 24. (NOTE: Preferably, the projections 62 are vertically centered on the couplers 42.) If the couplers 42 engage the cassette 14 with an uncertainty of minus 0.06 inch (i.e., the projections 62 are positioned 0.06 inch below the midpoint of the notches 60, so that the cassette 14 is "higher" than desired) and the carrier 26 moves to a position with an uncertainty of plus 0.07 inch, then the total uncertainty would be 0.13 inch. Therefore, the cassette 14 would contact the upper side of the vacant port and would not be insertable into the port 24, resulting in a failure. However, by implementing the repositioning sequence, the 0.06-inch uncertainty of the extraction sequence would be eliminated, and the total uncertainty would be 0.07 inch, resulting in the cassette 14 being insertable into the vacant port 24.

A brief summary of the above-described sequences follows:
1. Select Cassette: actuate the carrier motor to rotate the drive collar 29 about the shaft 28 to displace the carrier 26 to the desired storage unit 12 and cassette 14.
2. Engage Cassette: (a) drive the shaft 50 to translate the engaging assembly 36 forward, and (b) actuate the solenoid 46 to close the couplers 42 on the cassette 14.
3. Extract Cassette: drive the shaft 50 to translate the engaging assembly 36 with the cassette 14 backward.
4. Select Tape Drive: actuate the carrier motor to rotate the drive collar 29 about the shaft 28 to displace the carrier 26 to the port 24 of the desired tape drive 16.
5. Accurately Position Cassette: (a) disengage the cassette 14 by actuating the solenoid 46 to spread the couplers 42 to release the cassette 14 onto the reference platen 56, and (b) re-engage the cassette 14 by actuating the solenoid 46 to retract the plunger 47, closing the couplers 42 on the cassette 14.
6. Insert Cassette: drive the shaft 50 to translate the engaging assembly 36 with the cassette 14 forward.
7. Disengage Cassette: (a) actuate the solenoid 46 to spread the couplers 42 to release the cassette 14 in the port 24, and (b) drive the shaft 50 to translate the engaging assembly 36 backward.
8. Transport Another Cassette: repeat steps 1 through 7.

Although the description heretofore has centered on transporting one of the cassettes 14 from an occupied slot 22 of one of the storage units 12 to a vacant port 24 of one of the tape drives 16, it should be known that the cassette handling system 10 is also capable of transporting one of the cassettes 14 from one storage unit 12 to another storage unit 12, from a tape drive unit 16 to a storage unit 12, or from one tape drive 16 to another tape drive 16. In other words, the cassette handling system 10 is able to transport one of the cassette 14 between any combination of the storage units 12 and the tape drive units 16, including any external port through which a user manually inserts or removes a cassette. Furthermore, the arrangement of the storage units 12 and the tape drive units 16 could be modified from the exemplary embodiment shown in the drawings, in that the tape drive units 16 could be located above the storage units 12 and so on. Moreover, the repositioning sequence may take place immediately after the extraction sequence, in route to the port 24 or the slot 22 into which one of the cassettes 14 is to be inserted, but preferably immediately before the insertion sequence.

Referring to FIG. 8 and further referencing FIGS. 1 and 2, a further aspect of the cassette handling system 10 addresses the movement of the carrier assembly 26. As mentioned in the embodiment above, the shaft 28 is substantially vertical and is attached between a pair of spaced supports 66 within the housing 18. As it is desirable to transport one of the cassettes 14 quickly within the system 10, the carrier motor rotates the drive collar 29 about the shaft 28 at relatively high speeds, for example, at least approximately 1,000 revolutions per minute (rpm), preferably at approximately 2,000 rpm. Due to the rotation of the drive collar 29 and related factors such as frictional forces, the shaft 28 may be subject to vibration which may hinder the precision of the movement of the carrier 26. Therefore, a plurality of compression springs 68 are disposed at one of the ends of the shaft 28. The compression springs 68 may be Belleville springs, coil springs, or other suitable type. The compression springs 68 apply a force which is sufficient to increase the tension on the shaft 28 and reduce or damp the vibration resulting from the rotation of the drive collar 29. It has been found that approximately 50 pounds of force substantially eliminates significant vibration caused by the drive collar 29 rotating at approximately 2,000 rpm. Essentially, by applying such a force, the resonance of the shaft 28 is moved two or three harmonics above the frequency of the drive collar 29 (i.e., 2,000 rpm), such that the carrier 26 is vertically displaced much more smoothly and precisely than would be the case without the applied force. Incidently, given the frequency at which the drive collar 29 rotates and given the speed at which the plunger 46 and the shaft 50 of the engaging and driving assemblies 36 and 38 operate, one exchange may take approximately six seconds to eight seconds, depending upon the size of the cassette handling system 10.

In the foregoing disclosure, exemplary embodiments of the present invention are described in detail. However, the cassette handling system 10 is capable of various modification in structure and operation by one skilled in the art without departing from the invention concept disclosed herein, a number of such modifications having already been discussed above. Thus, by way of example and not of limitation, the accurate vertical positioning of the cassettes or cartridges may be accomplished by movable mechanical arrangements which would engage the upper and lower surfaces of the cassettes while the couplers relax their hold on the cassettes. Therefore, it is to be understood that the invention is capable of use in various other combinations and operating environments within the scope of the following claims.

What is claimed is:

1. A precision cassette handling system comprising:
   a storage unit for storing a plurality of magnetic tape cartridges or cassettes;
   a tape drive unit for reading data from or writing data to said cassettes;
   a movable cassette carrier assembly for removing said cassettes from said units, and for inserting said cassettes into said units;
   said carrier assembly including movable mechanical couplers for engaging and holding one of said cassettes, said movable mechanical couplers holding said cassette in a normal cassette position above said carrier;
   a locating platen, said locating platen being positioned on said carrier assembly immediately below said normal cassette position, said locating platen being fixed relative to said movable mechanical couplers and defining an accurate position, said accurate position being free of vertical positioning errors of said cassette when said cassette is in said normal cassette position so that said cassette is insertable into said units from said accurate position without obstruction; and
   control circuitry for operating said couplers to release said cassette onto said locating platen and to immediately re-grip said cassette in said accurate position as provided by said locating platen, prior to inserting said cassette into said units.

2. A cassette handling system, comprising:
   at least two ports in which a cassette is receivable, one of said ports being occupied by the cassette, one of said ports being vacant;
   a movable carrier assembly for transporting the cassette from said occupied port to said vacant port, said carrier assembly including an engaging assembly for extracting the cassette from said occupied port and inserting the cassette into said vacant port;
   a reference mechanical structure defining a reference position from which the cassette is insertable into said vacant port, said reference mechanical structure being fixed to said movable carrier assembly;
   said engaging assembly repositioning the cassette to said reference position defined by said reference mechanical structure prior to inserting the cassette into said vacant port;
   said reference mechanical structure being a reference platen formed on said carrier assembly, and said engaging assembly comprising a pair of couplers;
   said couplers engaging the cassette prior to said engaging assembly extracting the cassette from said occupied port;
   said couplers disengaging the cassette onto said reference platen and re-engaging the cassette on said reference platen in said reference position prior to said engaging assembly inserting the cassette into said vacant port;
   said engaging means further comprising a solenoid with an inner plunger positioned between said couplers; and
   said solenoid being actuatable to urge said couplers apart to disengage the cassette.

3. A system as claimed in claim 2, wherein said engaging means further comprises a spring disposed between said couplers;
   said spring urging said couplers together to engage the cassette.

4. A cassette handling system, comprising:
   at least two ports in which a cassette is receivable, one of said ports being occupied by the cassette, one of said ports being vacant;
   a movable carrier assembly for transporting the cassette from said occupied port to said vacant port, said carrier assembly including an engaging assembly for extracting the cassette from said occupied port and inserting the cassette into said vacant port;
   a reference mechanical structure defining a reference position from which the cassette is insertable into said vacant port, said reference mechanical structure being fixed to said movable carrier assembly;
   said engaging assembly repositioning the cassette to said reference position defined by said reference mechanical structure prior to inserting the cassette into said vacant port;
   said carrier assembly further including a threaded shaft and a rotatable drive collar, said shaft having two ends rotably engaged with a support structure of said cassette handling system; and
   said shaft receiving said drive collar thereon, said drive collar rotating about said shaft to move said carrier assembly between said ports.

5. A system as claimed in claim 4, further comprising tensioning structure at one of said ends of said shaft applying axial force, relative to said support structure, to said shaft such that vibration of said shaft is substantially eliminated.

6. A system as claimed in claim 4, wherein said carrier assembly further comprises at least one compression spring disposed at one of said ends of said shaft for applying force between said end of said shaft and said support structure, said at least one compression spring applying sufficient force such that axial tension of said shaft is increased to raise a resonant frequency of said shaft above a frequency at which said drive collar rotates about said shaft.

7. A system as claimed in claim 6, wherein said springs apply approximately 40 pounds of force to approximately 60 pounds of force to said shaft.

8. A system as claimed in claim 7, wherein said drive collar rotates about said shaft at at least approximately 1,500 revolutions per minute.

9. An automated precision cassette handling system, comprising:

a plurality of storage units for storing a plurality of cassettes;

a plurality of tape drive units for reading data from or writing data to the cassettes;

a cassette carrier assembly for transporting one of the cassettes from one said unit to another said unit, said carrier assembly including mechanical couplers for engaging the cassette, a solenoid with an inner plunger for operating said couplers, and a driving assembly for moving said couplers to extract the cassette from one said unit and to insert the cassette into another of said units;

said carrier assembly having a drive collar mounted on a threaded shaft, said drive collar rotating about said shaft to displace said carrier assembly vertically, said shaft having axial tension applied thereto by compression springs so that a resonant frequency thereof is greater than a frequency at which said drive collar rotates about said shaft;

a reference platen positioned on said carrier assembly, said reference platen defining a position from which the cassette is insertable into said units; and a control unit for actuating said driving assembly to extract and to insert the cassette, and for actuating said solenoid to operate said couplers to disengage one of the cassette being transported onto said reference platen and to re-engage the cassette while the cassette is positioned on said reference platen prior to inserting the cassette into one of said units;

whereby positioning the cassette on said reference platen and increasing the axial tension on said shaft improves the overall reliability of said cassette handling system.

10. A cassette handling system as claimed in claim 9, wherein said control unit positions the cassette immediately before inserting the cassette into one of said units;

whereby uncertainty due to the movement of said carrier assembly in the course of extracting the cassette from one of said units and due to the movement of said carrier assembly to another one of said units prior to inserting the cassette thereinto is eliminated, and the reliability of said cassette handling system is improved.

11. A carrier assembly for moving a cassette in a cassette handling system including a plurality of cassettes and at least one tape drive unit and a plurality of storage units, an occupied unit being defined as either a tape drive unit or a storage unit in which a cassette is received, a vacant unit being defined as either a tape drive unit or a storage unit in which a cassette is not received, said carrier assembly comprising:

(a) a reference platen for defining a reference position from which a cassette is insertable into the tape drive unit/units and the storage units;

(b) an engaging assembly for extracting a cassette from an occupied unit, for placing said cassette in said reference position on said reference platen, and for inserting said cassette into a vacant unit from said reference position, said engaging assembly including a pair of couplers; and (c) a driving assembly for translating said engaging assembly from an extracting position at which said cassette is extracted from said occupied unit, to a transporting position at which said cassette is placed on said reference platen and transported to said vacant unit, and to an inserting position at which said cassette is inserted into said vacant unit;

said pair of couplers for engaging said cassette in said occupied unit when said engaging assembly is in said extracting position;

said pair of couplers for releasing said cassette onto said reference plate and for engaging said cassette in said reference position when said engaging assembly is in said transporting position;

said pair of couplers for releasing said cassette in said vacant unit when said engaging assembly is in said inserting position; and said reference platen being fixed relative to said engaging assembly.

12. A carrier assembly as claimed in claim 11 further comprising a carrier having a top surface;

said reference platen being formed on said top surface of said carrier; and said engaging assembly being mounted on said carrier.

13. A carrier assembly as claimed in claim 12 wherein said carrier has an opening formed therethrough, said opening defining two spaced surfaces on said top surface of said carrier;

said reference platen being formed on said two spaced surfaces with said opening between said two spaced surfaces.

14. A carrier assembly as claimed in claim 13 wherein said driving assembly includes:

a threaded shaft rotatably mounted to said carrier below said opening; and a cassette insertion motor mounted to said carrier for driving said threaded shaft;

said engaging assembly consisting solely of:

said pair of couplers;

a base structure threadedly mounted on said threaded shaft and extending upward through said opening of said carrier, said pair of couplers being mounted to said base structure and positioned above said top surface of said carrier;

a solenoid mounted to said base structure and positioned between said pair of couplers, said solenoid having an inner plunger for urging said pair of couplers apart; and a spring attached to said pair of couplers and positioned between said pair of couplers, said spring for urging said pair of couplers together;

said cassette insertion motor driving said shaft to translate said engaging assembly among said extracting, transporting, and inserting positions; and said solenoid extending said inner plunger to urge said pair of couplers apart to release said cassette, and retracting said inner plunger so that said spring urges said pair of couplers together to engage said cassette.

* * * * *